US006993641B2

(12) United States Patent
Wong et al.

(10) Patent No.: US 6,993,641 B2
(45) Date of Patent: Jan. 31, 2006

(54) STALL CONTROL

(75) Inventors: Kar-Lik Kasim Wong, Old Windsor (GB); Nigel Peter Topham, Wokingham (GB)

(73) Assignee: PTS Corporation, San Jose, CA (US)

( * ) Notice: Subject to any disclaimer, the term of this patent is extended or adjusted under 35 U.S.C. 154(b) by 506 days.

(21) Appl. No.: 09/992,159

(22) Filed: Nov. 6, 2001

(65) Prior Publication Data

US 2002/0120831 A1 Aug. 29, 2002

(30) Foreign Application Priority Data

| Nov. 8, 2000 | (GB) | .................................... 0027294 |
| Oct. 12, 2001 | (GB) | .................................... 0124552 |

(51) Int. Cl.
    *G06F 16/16* (2006.01)
(52) U.S. Cl. .................................................. 712/219
(58) Field of Classification Search ................. 712/219
    See application file for complete search history.

(56) References Cited

U.S. PATENT DOCUMENTS

| 5,860,000 A | * | 1/1999 | Biswas et al. ............... 712/244 |
| 6,044,456 A | * | 3/2000 | Murty et al. ................. 712/219 |
| 6,279,100 B1 | * | 8/2001 | Tremblay et al. ............. 712/24 |
| 6,477,638 B1 | * | 11/2002 | Gearty et al. ............... 712/220 |
| 6,587,940 B1 | * | 7/2003 | Soltis et al. ................ 712/216 |

FOREIGN PATENT DOCUMENTS

| GB | 2 348 526 | 10/2000 |
| WO | 00/33183 | 6/2000 |

* cited by examiner

*Primary Examiner*—William M. Treat
(74) *Attorney, Agent, or Firm*—Greer, Burns & Crain, Ltd.

(57) ABSTRACT

Processors comprising a plurality of pipelines are disclosed, each pipeline having a plurality of pipeline stages (142, 146) for executing an instruction on successive clock cycles. The processors include distributed stall control circuitry (148, 150, 152, 154) which allow an instruction in one pipeline to become temporarily out of step with an instruction in another pipeline. This may allow time for a global signal, such as a global stall signal, to be distributed.

17 Claims, 22 Drawing Sheets

| T=1 | 0 | 1 | 2 | 3 | 4 | 5 | 6 | |
|---|---|---|---|---|---|---|---|---|
| Cluster 0 | 106 | 105 | 104 | 103 | 102 | 101 | 100 | pipe 0 |
|  | 106 | 105 | 104 | 103 | 102 | 101 | 100 | pipe 1 |
| Cluster 1 | 106 | 105 | 104 | 103 | 102 | 101 | 100 | pipe 0 |
|  | 106 | 105 | 104 | 103 | 102 | 101 | 100 | pipe 1 |
| Cluster 2 | 106 | 105 | 104 | 103 | 102 | 101 | 100 | pipe 0 |
|  | 106 | 105 | 104 | 103 | 102 | 101 | 100 | pipe 1 |
| Cluster 3 | 106 | 105 | 104 | 103 | 102 | 101 | 100 | pipe 0 |
|  | 106 | 105 | 104 | 103 | 102 | 101 | 100 | pipe 1 |

Fig.7

| T=2 | 0 | 1 | 2 | 3 | 4 | 5 | 6 | |
|---|---|---|---|---|---|---|---|---|
| Cluster 0 | 107 | 106 | 105 | 104 | 103 | 102 | 101 | pipe 0 |
|  | 107 | 106 | 105 | 104 | 103 | 102 | 101 | pipe 1 |
| Cluster 1 | 106 | 105 | 104 | 103 | - | 102 | 101 | pipe 0 |
|  | 106 | 105 | 104 | 103 | - | 102 | 101 | pipe 1 |
| Cluster 2 | 107 | 106 | 105 | 104 | 103 | 102 | 101 | pipe 0 |
|  | 107 | 106 | 105 | 104 | 103 | 102 | 101 | pipe 1 |
| Cluster 3 | 107 | 106 | 105 | 104 | 103 | 102 | 101 | pipe 0 |
|  | 107 | 106 | 105 | 104 | 103 | 102 | 101 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | 102 | pipe 0 |
|  | 107 | 106 | 105 | 104 | 103 | - | 102 | pipe 1 |
| Cluster 1 | 107 | 106 | 105 | 104 | 103 | - | 102 | pipe 0 |
|  | 107 | 106 | 105 | 104 | 103 | - | 102 | pipe 1 |
| Cluster 2 | 107 | 106 | 105 | 104 | 103 | - | 102 | pipe 0 |
|  | 107 | 106 | 105 | 104 | 103 | - | 102 | pipe 1 |
| Cluster 3 | 107 | 106 | 105 | 104 | 103 | - | 102 | pipe 0 |
|  | 107 | 106 | 105 | 104 | 103 | - | 102 | pipe 1 |

| | 0 | 1 | 2 | 3 | 4 | 5 | 6 | |
|---|---|---|---|---|---|---|---|---|
| Cluster 0 | 108 | 107 | 106 | 105 | 104 | 103 | - | pipe 0 |
|  | 108 | 107 | 106 | 105 | 104 | 103 | - | pipe 1 |
| Cluster 1 | 108 | 107 | 106 | 105 | 104 | 103 | - | pipe 0 |
|  | 108 | 107 | 106 | 105 | 104 | 103 | - | pipe 1 |
| Cluster 2 | 108 | 107 | 106 | 105 | 104 | 103 | - | pipe 0 |
|  | 108 | 107 | 106 | 105 | 104 | 103 | - | pipe 1 |
| Cluster 3 | 108 | 107 | 106 | 105 | 104 | 103 | - | pipe 0 |
|  | 108 | 107 | 106 | 105 | 104 | 103 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | 101 | 100 | pipe 0 |
| | 106 | 105 | 104 | 103 | 102 | 101 | 100 | pipe 1 |
| Cluster 1 | 106 | 105 | 104 | 103 | 102 | 101 | 100 | pipe 0 |
| | 106 | 105 | 104 | 103 | 102 | 101 | 100 | pipe 1 |
| Cluster 2 | 106 | 105 | 104 | 103 | 102 | 101 | 100 | pipe 0 |
| | 106 | 105 | 104 | 103 | 102 | 101 | 100 | pipe 1 |
| Cluster 3 | 106 | 105 | 104 | 103 | 102 | 101 | 100 | pipe 0 |
| | 106 | 105 | 104 | 103 | 102 | 101 | 100 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | 102 | 101 | pipe 0 |
| | 107 | 106 | 105 | 104 | 103 | 102 | 101 | pipe 1 |
| Cluster 1 | 106 | 105 | 104 | 103 | - | 102 | 101 | pipe 0 |
| | 106 | 105 | 104 | 103 | - | 102 | 101 | pipe 1 |
| Cluster 2 | 106 | 105 | - | 104 | 103 | 102 | 101 | pipe 0 |
| | 106 | 105 | - | 104 | 103 | 102 | 101 | pipe 1 |
| Cluster 3 | 107 | 106 | 105 | 104 | 103 | 102 | 101 | pipe 0 |
| | 107 | 106 | 105 | 104 | 103 | 102 | 101 | pipe 1 |

Fig.12

| T=3 | 0 | 1 | 2 | 3 | 4 | 5 | 6 | |
|---|---|---|---|---|---|---|---|---|
| Cluster 0 | 107 | 106 | 105 | 104 | 103 | - | 102 | pipe 0 |
| | 107 | 106 | 105 | 104 | 103 | - | 102 | pipe 1 |
| Cluster 1 | 107 | 106 | 105 | 104 | 103 | - | 102 | pipe 0 |
| | 107 | 106 | 105 | 104 | 103 | - | 102 | pipe 1 |
| Cluster 2 | 107 | 106 | 105 | 104 | 103 | - | 102 | pipe 0 |
| | 107 | 106 | 105 | 104 | 103 | - | 102 | pipe 1 |
| Cluster 3 | 107 | 106 | 105 | 104 | 103 | - | 102 | pipe 0 |
| | 107 | 106 | 105 | 104 | 103 | - | 102 | pipe 1 |

*Fig.13*

| T=4 | 0 | 1 | 2 | 3 | 4 | 5 | 6 | |
|---|---|---|---|---|---|---|---|---|
| Cluster 0 | 108 | 107 | 106 | 105 | 104 | 103 | - | pipe 0 |
| | 108 | 107 | 106 | 105 | 104 | 103 | - | pipe 1 |
| Cluster 1 | 108 | 107 | 106 | 105 | 104 | 103 | - | pipe 0 |
| | 108 | 107 | 106 | 105 | 104 | 103 | - | pipe 1 |
| Cluster 2 | 108 | 107 | 106 | 105 | 104 | 103 | - | pipe 0 |
| | 108 | 107 | 106 | 105 | 104 | 103 | - | pipe 1 |
| Cluster 3 | 108 | 107 | 106 | 105 | 104 | 103 | - | pipe 0 |
| | 108 | 107 | 106 | 105 | 104 | 103 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | 101 | 100 | pipe 0 |
| | 106 | 105 | 104 | 103 | 102 | 101 | 100 | pipe 1 |
| Cluster 1 | 106 | 105 | 104 | 103 | 102 | 101 | 100 | pipe 0 |
| | 106 | 105 | 104 | 103 | 102 | 101 | 100 | pipe 1 |
| Cluster 2 | 106 | 105 | 104 | 103 | 102 | 101 | 100 | pipe 0 |
| | 106 | 105 | 104 | 103 | 102 | 101 | 100 | pipe 1 |
| Cluster 3 | 106 | 105 | 104 | 103 | 102 | 101 | 100 | pipe 0 |
| | 106 | 105 | 104 | 103 | 102 | 101 | 100 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | 102 | 101 | pipe 0 |
| | 107 | 106 | 105 | 104 | 103 | 102 | 101 | pipe 1 |
| Cluster 1 | 106 | 105 | 104 | 103 | - | 102 | 101 | pipe 0 |
| | 106 | 105 | 104 | 103 | - | 102 | 101 | pipe 1 |
| Cluster 2 | 107 | 106 | 105 | 104 | 103 | 102 | 101 | pipe 0 |
| | 107 | 106 | 105 | 104 | 103 | 102 | 101 | pipe 1 |
| Cluster 3 | 107 | 106 | 105 | 104 | 103 | 102 | 101 | pipe 0 |
| | 107 | 106 | 105 | 104 | 103 | 102 | 101 | pipe 1 |

| | 0 | 1 | 2 | 3 | 4 | 5 | 6 | |
|---|---|---|---|---|---|---|---|---|
| Cluster 0 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |
| Cluster 1 | 106 | 105 | 104 | 103 | - | - | 102 | pipe 0 |
| | 106 | 105 | 104 | 103 | - | - | 102 | pipe 1 |
| Cluster 2 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |
| Cluster 3 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | - | pipe 0 |
| | 107 | 106 | 105 | 104 | 103 | - | - | pipe 1 |
| Cluster 1 | 107 | 106 | 105 | 104 | 103 | - | - | pipe 0 |
| | 107 | 106 | 105 | 104 | 103 | - | - | pipe 1 |
| Cluster 2 | 107 | 106 | 105 | 104 | 103 | - | - | pipe 0 |
| | 107 | 106 | 105 | 104 | 103 | - | - | pipe 1 |
| Cluster 3 | 107 | 106 | 105 | 104 | 103 | - | - | pipe 0 |
| | 107 | 106 | 105 | 104 | 103 | - | - | pipe 1 |

| | 0 | 1 | 2 | 3 | 4 | 5 | 6 | |
|---|---|---|---|---|---|---|---|---|
| Cluster 0 | 108 | 107 | 106 | 105 | 104 | 103 | - | pipe 0 |
| | 108 | 107 | 106 | 105 | 104 | 103 | - | pipe 1 |
| Cluster 1 | 108 | 107 | 106 | 105 | 104 | 103 | - | pipe 0 |
| | 108 | 107 | 106 | 105 | 104 | 103 | - | pipe 1 |
| Cluster 2 | 108 | 107 | 106 | 105 | 104 | 103 | - | pipe 0 |
| | 108 | 107 | 106 | 105 | 104 | 103 | - | pipe 1 |
| Cluster 3 | 108 | 107 | 106 | 105 | 104 | 103 | - | pipe 0 |
| | 108 | 107 | 106 | 105 | 104 | 103 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | 101 | 100 | pipe 0 |
| | 106 | 105 | 104 | 103 | 102 | 101 | 100 | pipe 1 |
| Cluster 1 | 106 | 105 | 104 | 103 | 102 | 101 | 100 | pipe 0 |
| | 106 | 105 | 104 | 103 | 102 | 101 | 100 | pipe 1 |
| Cluster 2 | 106 | 105 | 104 | 103 | 102 | 101 | 100 | pipe 0 |
| | 106 | 105 | 104 | 103 | 102 | 101 | 100 | pipe 1 |
| Cluster 3 | 106 | 105 | 104 | 103 | 102 | 101 | 100 | pipe 0 |
| | 106 | 105 | 104 | 103 | 102 | 101 | 100 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | 102 | 101 | pipe 0 |
| | 107 | 106 | 105 | 104 | 103 | 102 | 101 | pipe 1 |
| Cluster 1 | 106 | 105 | 104 | 103 | - | 102 | 101 | pipe 0 |
| | 106 | 105 | 104 | 103 | - | 102 | 101 | pipe 1 |
| Cluster 2 | 107 | 106 | 105 | 104 | 103 | 102 | 101 | pipe 0 |
| | 107 | 106 | 105 | 104 | 103 | 102 | 101 | pipe 1 |
| Cluster 3 | 106 | 105 | 104 | 103 | - | 102 | 101 | pipe 0 |
| | 106 | 105 | 104 | 103 | - | 102 | 101 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | 102 | pipe 0 |
| | 107 | 106 | 105 | 104 | 103 | - | 102 | pipe 1 |
| Cluster 1 | 106 | 105 | 104 | 103 | - | - | 102 | pipe 0 |
| | 106 | 105 | 104 | 103 | - | - | 102 | pipe 1 |
| Cluster 2 | 107 | 106 | 105 | 104 | 103 | - | 102 | pipe 0 |
| | 107 | 106 | 105 | 104 | 103 | - | 102 | pipe 1 |
| Cluster 3 | 106 | 105 | 104 | 103 | - | - | 102 | pipe 0 |
| | 106 | 105 | 104 | 103 | - | - | 102 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | - | pipe 0 |
| | 107 | 106 | 105 | 104 | 103 | - | - | pipe 1 |
| Cluster 1 | 107 | 106 | 105 | 104 | 103 | - | - | pipe 0 |
| | 107 | 106 | 105 | 104 | 103 | - | - | pipe 1 |
| Cluster 2 | 107 | 106 | 105 | 104 | 103 | - | - | pipe 0 |
| | 107 | 106 | 105 | 104 | 103 | - | - | pipe 1 |
| Cluster 3 | 107 | 106 | 105 | 104 | 103 | - | - | pipe 0 |
| | 107 | 106 | 105 | 104 | 103 | - | - | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | 102 | pipe 0 |
| | 107 | 106 | 105 | 104 | 103 | - | 102 | pipe 1 |
| Cluster 1 | 106 | 105 | 104 | 103 | - | - | 102 | pipe 0 |
| | 106 | 105 | 104 | 103 | - | - | 102 | pipe 1 |
| Cluster 2 | 107 | 106 | 105 | 104 | 103 | - | 102 | pipe 0 |
| | 107 | 106 | 105 | 104 | 103 | - | 102 | pipe 1 |
| Cluster 3 | 106 | 105 | 104 | 103 | - | - | 102 | pipe 0 |
| | 106 | 105 | 104 | 103 | - | - | 102 | pipe 1 |

| | 0 | 1 | 2 | 3 | 4 | 5 | 6 | |
|---|---|---|---|---|---|---|---|---|
| Cluster 0 | ~~107~~ | ~~106~~ | ~~105~~ | ~~104~~ | ~~103~~ | - | - | pipe 0 |
| | ~~107~~ | ~~106~~ | ~~105~~ | ~~104~~ | ~~103~~ | - | - | pipe 1 |
| Cluster 1 | ~~107~~ | ~~106~~ | ~~105~~ | ~~104~~ | ~~103~~ | - | - | pipe 0 |
| | ~~107~~ | ~~106~~ | ~~105~~ | ~~104~~ | ~~103~~ | - | - | pipe 1 |
| Cluster 2 | ~~107~~ | ~~106~~ | ~~105~~ | ~~104~~ | ~~103~~ | - | - | pipe 0 |
| | ~~107~~ | ~~106~~ | ~~105~~ | ~~104~~ | ~~103~~ | - | - | pipe 1 |
| Cluster 3 | ~~106~~ | ~~105~~ | ~~104~~ | ~~103~~ | - | - | - | pipe 0 |
| | ~~106~~ | ~~105~~ | ~~104~~ | ~~103~~ | - | - | - | pipe 1 |

| | 0 | 1 | 2 | 3 | 4 | 5 | 6 | |
|---|---|---|---|---|---|---|---|---|
| Cluster 0 | ~~106~~ | ~~105~~ | ~~104~~ | ~~103~~ | ~~102~~ | 101 | 100 | pipe 0 |
| | ~~106~~ | ~~105~~ | ~~104~~ | ~~103~~ | ~~102~~ | 101 | 100 | pipe 1 |
| Cluster 1 | 106 | 105 | 104 | 103 | 102 | 101 | 100 | pipe 0 |
| | 106 | 105 | 104 | 103 | 102 | 101 | 100 | pipe 1 |
| Cluster 2 | ~~106~~ | ~~105~~ | ~~104~~ | 103 | 102 | 101 | 100 | pipe 0 |
| | ~~106~~ | ~~105~~ | ~~104~~ | 103 | 102 | 101 | 100 | pipe 1 |
| Cluster 3 | 106 | 105 | 104 | 103 | 102 | 101 | 100 | pipe 0 |
| | 106 | 105 | 104 | 103 | 102 | 101 | 100 | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | - | 101 | pipe 0 |
| | 106 | 105 | 104 | 103 | 102 | - | 101 | pipe 1 |
| Cluster 1 | 107 | 106 | 105 | 104 | 103 | 102 | 101 | pipe 0 |
| | 107 | 106 | 105 | 104 | 103 | 102 | 101 | pipe 1 |
| Cluster 2 | 106 | 105 | 104 | - | 103 | 102 | 101 | pipe 0 |
| | 106 | 105 | 104 | - | 103 | 102 | 101 | pipe 1 |
| Cluster 3 | 107 | 106 | 105 | 104 | 103 | 102 | 101 | pipe 0 |
| | 107 | 106 | 105 | 104 | 103 | 102 | 101 | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | - | - | pipe 0 |
| | 106 | 105 | 104 | 103 | 102 | - | - | pipe 1 |
| Cluster 1 | 107 | 106 | 105 | 104 | 103 | 102 | - | pipe 0 |
| | 107 | 106 | 105 | 104 | 103 | 102 | - | pipe 1 |
| Cluster 2 | 106 | 105 | 104 | - | 103 | 102 | - | pipe 0 |
| | 106 | 105 | 104 | - | 103 | 102 | - | pipe 1 |
| Cluster 3 | 107 | 106 | 105 | 104 | 103 | 102 | - | pipe 0 |
| | 107 | 106 | 105 | 104 | 103 | 102 | - | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | 102 | - | pipe 0 |
| | 107 | 106 | 105 | 104 | 103 | 102 | - | pipe 1 |
| Cluster 1 | 107 | 106 | 105 | 104 | 103 | 102 | - | pipe 0 |
| | 107 | 106 | 105 | 104 | 103 | 102 | - | pipe 1 |
| Cluster 2 | 107 | 106 | 105 | 104 | 103 | 102 | - | pipe 0 |
| | 107 | 106 | 105 | 104 | 103 | 102 | - | pipe 1 |
| Cluster 3 | 107 | 106 | 105 | 104 | 103 | 102 | - | pipe 0 |
| | 107 | 106 | 105 | 104 | 103 | 102 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | - | - | pipe 0 |
| | 106 | 105 | 104 | 103 | 102 | - | - | pipe 1 |
| Cluster 1 | 107 | 106 | 105 | 104 | 103 | 102 | - | pipe 0 |
| | 107 | 106 | 105 | 104 | 103 | 102 | - | pipe 1 |
| Cluster 2 | 106 | 105 | 104 | - | 103 | 102 | - | pipe 0 |
| | 106 | 105 | 104 | - | 103 | 102 | - | pipe 1 |
| Cluster 3 | 107 | 106 | 105 | 104 | 103 | 102 | - | pipe 0 |
| | 107 | 106 | 105 | 104 | 103 | 102 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | - | - | pipe 0 |
| | 106 | 105 | 104 | 103 | 102 | - | - | pipe 1 |
| Cluster 1 | 107 | 106 | 105 | 104 | 103 | 102 | - | pipe 0 |
| | 107 | 106 | 105 | 104 | 103 | 102 | - | pipe 1 |
| Cluster 2 | 107 | 106 | 105 | 104 | 103 | 102 | - | pipe 0 |
| | 107 | 106 | 105 | 104 | 103 | 102 | - | pipe 1 |
| Cluster 3 | 107 | 106 | 105 | 104 | 103 | 102 | - | pipe 0 |
| | 107 | 106 | 105 | 104 | 103 | 102 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | - | - | pipe 0 |
| | 106 | 105 | 104 | 103 | 102 | - | - | pipe 1 |
| Cluster 1 | 107 | 106 | 105 | 104 | 103 | 102 | - | pipe 0 |
| | 107 | 106 | 105 | 104 | 103 | 102 | - | pipe 1 |
| Cluster 2 | 106 | 105 | 104 | - | 103 | 102 | - | pipe 0 |
| | 106 | 105 | 104 | - | 103 | 102 | - | pipe 1 |
| Cluster 3 | 107 | 106 | 105 | 104 | 103 | 102 | - | pipe 0 |
| | 107 | 106 | 105 | 104 | 103 | 102 | - | pipe 1 |

| | 0 | 1 | 2 | 3 | 4 | 5 | 6 | |
|---|---|---|---|---|---|---|---|---|
| Cluster 0 | ~~107~~ | ~~106~~ | ~~105~~ | ~~104~~ | 103 | 102 | - | pipe 0 |
| | ~~107~~ | ~~106~~ | ~~105~~ | ~~104~~ | 103 | 102 | - | pipe 1 |
| Cluster 1 | ~~107~~ | ~~106~~ | ~~105~~ | ~~104~~ | 103 | 102 | - | pipe 0 |
| | ~~107~~ | ~~106~~ | ~~105~~ | ~~104~~ | 103 | 102 | - | pipe 1 |
| Cluster 2 | ~~106~~ | ~~105~~ | ~~104~~ | - | 103 | 102 | - | pipe 0 |
| | ~~106~~ | ~~105~~ | ~~104~~ | - | 103 | 102 | - | pipe 1 |
| Cluster 3 | ~~107~~ | ~~106~~ | ~~105~~ | ~~104~~ | 103 | 102 | - | pipe 0 |
| | ~~107~~ | ~~106~~ | ~~105~~ | ~~104~~ | 103 | 102 | - | pipe 1 |

| | 0 | 1 | 2 | 3 | 4 | 5 | 6 | |
|---|---|---|---|---|---|---|---|---|
| Cluster 0 | 106 | 105 | 104 | 103 | 102 | 101 | 100 | pipe 0 |
| | 106 | 105 | 104 | 103 | 102 | 101 | 100 | pipe 1 |
| Cluster 1 | ~~106~~ | ~~105~~ | ~~104~~ | ~~103~~ | 102 | 101 | 100 | pipe 0 |
| | ~~106~~ | ~~105~~ | ~~104~~ | ~~103~~ | 102 | 101 | 100 | pipe 1 |
| Cluster 2 | 106 | 105 | 104 | 103 | 102 | 101 | 100 | pipe 0 |
| | 106 | 105 | 104 | 103 | 102 | 101 | 100 | pipe 1 |
| Cluster 3 | 106 | 105 | 104 | 103 | 102 | 101 | 100 | pipe 0 |
| | 106 | 105 | 104 | 103 | 102 | 101 | 100 | pipe 1 |

| | 0 | 1 | 2 | 3 | 4 | 5 | 6 | |
|---|---|---|---|---|---|---|---|---|
| Cluster 0 | ~~107~~ | ~~106~~ | ~~105~~ | ~~104~~ | ~~103~~ | 102 | 101 | pipe 0 |
| | ~~107~~ | ~~106~~ | ~~105~~ | ~~104~~ | ~~103~~ | 102 | 101 | pipe 1 |
| Cluster 1 | ~~106~~ | ~~105~~ | ~~104~~ | ~~103~~ | - | 102 | 101 | pipe 0 |
| | ~~106~~ | ~~105~~ | ~~104~~ | ~~103~~ | - | 102 | 101 | pipe 1 |
| Cluster 2 | ~~107~~ | ~~106~~ | ~~105~~ | ~~104~~ | ~~103~~ | 102 | 101 | pipe 0 |
| | ~~107~~ | ~~106~~ | ~~105~~ | ~~104~~ | ~~103~~ | 102 | 101 | pipe 1 |
| Cluster 3 | ~~107~~ | ~~106~~ | ~~105~~ | ~~104~~ | ~~103~~ | 102 | 101 | pipe 0 |
| | ~~107~~ | ~~106~~ | ~~105~~ | ~~104~~ | ~~103~~ | 102 | 101 | pipe 1 |

| | 0 | 1 | 2 | 3 | 4 | 5 | 6 | |
|---|---|---|---|---|---|---|---|---|
| Cluster 0 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |
| Cluster 1 | 106 | 105 | 104 | 103 | - | - | 102 | pipe 0 |
| | 106 | 105 | 104 | 103 | - | - | 102 | pipe 1 |
| Cluster 2 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |
| Cluster 3 | ~~107~~ | ~~106~~ | ~~105~~ | ~~104~~ | ~~103~~ | - | 102 | pipe 0 |
| | ~~107~~ | ~~106~~ | ~~105~~ | ~~104~~ | ~~103~~ | - | 102 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | - | pipe 0 |
| | 107 | 106 | 105 | 104 | 103 | - | - | pipe 1 |
| Cluster 1 | 107 | 106 | 105 | 104 | 103 | - | - | pipe 0 |
| | 107 | 106 | 105 | 104 | 103 | - | - | pipe 1 |
| Cluster 2 | 107 | 106 | 105 | 104 | 103 | - | - | pipe 0 |
| | 107 | 106 | 105 | 104 | 103 | - | - | pipe 1 |
| Cluster 3 | 107 | 106 | 105 | 104 | 103 | - | - | pipe 0 |
| | 107 | 106 | 105 | 104 | 103 | - | - | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | 102 | pipe 0 |
| | 107 | 106 | 105 | 104 | 103 | - | 102 | pipe 1 |
| Cluster 1 | 106 | 105 | 104 | 103 | - | - | 102 | pipe 0 |
| | 106 | 105 | 104 | 103 | - | - | 102 | pipe 1 |
| Cluster 2 | 107 | 106 | 105 | 104 | 103 | - | 102 | pipe 0 |
| | 107 | 106 | 105 | 104 | 103 | - | 102 | pipe 1 |
| Cluster 3 | 107 | 106 | 105 | 104 | 103 | - | 102 | pipe 0 |
| | 107 | 106 | 105 | 104 | 103 | - | 102 | pipe 1 |

| | 0 | 1 | 2 | 3 | 4 | 5 | 6 | |
|---|---|---|---|---|---|---|---|---|
| Cluster 0 | 107 | 106 | 105 | 104 | 103 | - | - | pipe 0 |
| | 107 | 106 | 105 | 104 | 103 | - | - | pipe 1 |
| Cluster 1 | 107 | 106 | 105 | 104 | 103 | - | - | pipe 0 |
| | 107 | 106 | 105 | 104 | 103 | - | - | pipe 1 |
| Cluster 2 | 107 | 106 | 105 | 104 | 103 | - | - | pipe 0 |
| | 107 | 106 | 105 | 104 | 103 | - | - | pipe 1 |
| Cluster 3 | 107 | 106 | 105 | 104 | 103 | - | - | pipe 0 |
| | 107 | 106 | 105 | 104 | 103 | - | - | pipe 1 |

| | 0 | 1 | 2 | 3 | 4 | 5 | 6 | |
|---|---|---|---|---|---|---|---|---|
| Cluster 0 | 108 | 107 | 106 | 105 | 104 | 103 | - | pipe 0 |
| | 108 | 107 | 106 | 105 | 104 | 103 | - | pipe 1 |
| Cluster 1 | 108 | 107 | 106 | 105 | 104 | 103 | - | pipe 0 |
| | 108 | 107 | 106 | 105 | 104 | 103 | - | pipe 1 |
| Cluster 2 | 108 | 107 | 106 | 105 | 104 | 103 | - | pipe 0 |
| | 108 | 107 | 106 | 105 | 104 | 103 | - | pipe 1 |
| Cluster 3 | 107 | 106 | 105 | 104 | 103 | - | - | pipe 0 |
| | 107 | 106 | 105 | 104 | 103 | - | - | pipe 1 |

Fig.41

STALL CONTROL

BACKGROUND OF THE INVENTION

The present invention relates to processors and methods of operating processors. The invention has particular application in parallel pipelined processors, such as very long instruction word (VLIW) processors.

High performance processors use a technique known as pipelining to increase the rate at which instructions can be processed. Pipelining works by executing an instruction in several phases, with each phase being executed in a single pipeline stage. Instructions flow through successive pipeline stages, with all partially-completed instructions moving one stage forward on each processor clock cycle. Instructions complete execution when they reach the end of the pipeline.

Processors attempt to keep pipelines full at all times, thus ensuring a high rate of instruction completion. However, it is possible that an instruction may not be able to progress through one of the stages of a pipeline in a single clock cycle for some reason, for example, because it needs to access slow memory or to compute a multi-cycle operation. Such an event is known as a stall. When stage i of a pipeline stalls it prevents the instruction at stage i−1 from making forward progress, even if the instruction at stage i−1 is not itself stalled. This in turn stalls stage i−2, and so on up to stage 0 (the first stage). When there is a stall at stage i, a signal flows to all stages from 0 to i−1 in the pipeline to cause them to stall before the next active edge of the pipeline clock.

Some processor architectures provide two or more parallel pipelines for processing different instructions (or different parts of an instruction) simultaneously. In this case, the stall signal must be distributed to all pipelines to ensure that instructions which are issued in parallel also complete in parallel. However, the delay of propagating such a global stall signal may restrict the operating clock frequency of the processor. Furthermore, the distance such a signal would have to travel would grow as more pipelines were added. Hence a processor having more pipelines would need a lower clock frequency, thus defeating the high throughput objective of adding further pipelines.

SUMMARY OF THE INVENTION

The present invention seeks to overcome the above disadvantages.

According to a first aspect of the present invention there is provided a processor comprising a plurality of pipelines, each pipeline having a plurality of pipeline stages for executing an instruction on successive clock cycles, and stalling means for stalling the execution of instructions in all of the pipelines in response to a stall signal generated in any one of the pipelines. The stalling means is adapted to stall the execution of an instruction in a pipeline not generating the stall signal at least one clock cycle later than the execution of an instruction in a pipeline generating the stall signal, and to release the stall in the pipeline not generating the stall signal at least one clock cycle later than the stall in the pipeline generating the stall signal.

Stalling the execution of instructions in different pipelines in different clock cycles may make additional time available for distributing the stall signal from the pipeline generating the stall signal to other pipelines. This may allow the processor to operate at a higher speed than would otherwise be the case. By releasing the stall in the pipeline not generating the stall signal at least one clock cycle later than the stall in the pipeline generating the stall signal, the instructions in the various pipelines may return to alignment after being out of step for one or more clock cycles. Preferably the number of clock cycles between the respective pipelines being released from the stall is the same as the number of clock cycles between the respective pipelines being stalled.

The present invention may be applied to the whole or any part of a processor pipeline. Each pipeline may comprise, for example, one or more of an address computation stage, an instruction fetch stage, an instruction decode stage, an instruction execute stage, and/or other stages or sub-stages.

If two or more pipelines generate a stall signal simultaneously, then it may not be necessary to stall each pipeline in response to the stall signal generated by the other pipeline. This is because each pipeline may have already implemented the appropriate stall. If each pipeline were also stalled in response to the stall signal generated by the other pipeline, more stalls than necessary may be implemented. Thus the stalling means may be arranged such that, when a pipeline stage in a first pipeline receives a stall signal from a second pipeline, the execution of instructions in the pipeline stage in the first pipeline is not stalled if that pipeline stage stalled in the previous cycle in response to a stall signal generated by the first pipeline.

The stalling means may be arranged such that, when a pipeline generates a stall signal at a stage i, all stages up to and including stage i of that pipeline are stalled. In this way, earlier stages in a pipeline are stalled to prevent instructions in a pipeline from overwriting each other. Later stages need not be stalled, so the instructions in later stages may continue to progress through the pipeline as normal, although, if required, some or all of the later stages could also be stalled.

The stalling means may be arranged such that, when a pipeline generates a stall signal at a stage i, all stages up to and including stage i of that pipeline are stalled on a given clock cycle, and all stages up to and including stage i+m of a pipeline not generating a stall signal are stalled m clock cycles later than said given clock cycle, where m is an integer greater than or equal to 1. By providing that all stages up to i+m are stalled m clock cycles later in a pipeline not generating a stall signal, the instructions in that pipeline which correspond to the stalled instructions in the pipeline generating the stall signal are stalled.

The processor may comprise a plurality of pipeline clusters, each cluster comprising a plurality of pipelines. In this case, the stalling means may be arranged to stall execution of instructions in pipelines within a cluster in the same clock cycle.

Preferably, in operation, instructions entering the respective pipelines in parallel (that is to say, in a particular clock cycle) exit the pipelines in parallel. Different instructions may be executed in different pipelines. For example, the processor may be a VLIW processor in which instructions from a VLIW instruction packet are issued in parallel to the pipelines.

Each pipeline may include at least one execute stage in which an instruction is at least partially executed. The processor may be arranged such that the pipelines are not flushed in response to the stall signal.

Preferably the stall control means is distributed between two or more pipeline stages. This can allow each pipeline stage to take control of its own stalling. Such an arrangement can make the stalling mechanism easily scalable to include further pipelines or pipeline stages as required.

Thus, two or more pipeline stages may each have associated stall control circuitry for controlling the stalling of that pipeline stage. The stall control circuitry in each pipeline stage may be arranged to generate a global stall signal for stalling another pipeline, and to receive a global stall signal from another pipeline for stalling the pipeline stage with which the circuitry is associated. The stall control circuitry may be arranged so as not to generate a global stall signal if the associated pipeline stage is subject to a global stall from the same stage or later in another pipeline. This can help to ensure that the instructions in the various pipelines realign correctly in the situation where two or more pipelines generate stall signals at the same time. Preferably the stall control circuitry in each of the two or more pipelines is substantially the same.

The processor may be arranged such that a pipeline stage is not stalled if there is a bubble in that pipeline stage. This can allow instructions to move forward into a bubble, even when the instructions would otherwise be stalled.

According to a second aspect of the present invention there is provided a processor comprising a plurality of pipelines, each pipeline having a plurality of pipeline stages for carrying out a series of operations on information passing through the pipelines, two or more pipeline stages each being provided with associated stall control circuitry for controlling the stalling of that pipeline stage, the control circuitry comprising:

means for generating a hold signal for stalling the associated pipeline stage in response to either a local stall signal generated by that pipeline stage or a global stall signal generated by another pipeline;

means for generating a global stall signal for stalling another pipeline in response to said local stall signal; and means for delaying the global stall signal such that the global stall signal is asserted a given number of clock cycles later than the hold signal is asserted, and the global stall signal is released the same number of clock cycles later than the hold signal is released.

Any of the features of the first aspect may be applied to the second aspect.

Corresponding methods are also provided, and thus in a third aspect of the invention there is provided a method of operating a processor, the processor comprising a plurality of pipelines, each pipeline having a plurality of pipeline stages for executing instructions on successive clock cycles, each pipeline being capable of generating a stall signal, the method comprising:

generating a stall signal in one of the pipelines;

stalling the execution of an instruction in the pipeline generating the stall signal;

stalling the execution of an instruction in a pipeline not generating the stall signal at least one clock cycle later;

releasing the stall in the pipeline generating the stall signal; and releasing the stall in the pipeline not generating the stall signal at least one clock cycle later.

Any of the processor features may be provided as method features and vice versa.

According to a fourth aspect of the invention there is provided a processor comprising:

a plurality of pipelines, each pipeline having a plurality of pipeline stages for executing an instruction on successive clock cycles; and stall control circuitry which controls the stalling of instructions in the pipelines;

wherein the stall control circuitry is adapted to stall the execution of an instruction in a pipeline not generating the stall signal at least one clock cycle later than the execution of an instruction in a pipeline generating the stall signal, and to release the stall in the pipeline not generating the stall signal at least one clock cycle later than the stall in the pipeline generating the stall signal.

According to a fifth aspect of the invention there is provided a processor comprising a plurality of pipelines, each pipeline having a plurality of pipeline stages which carry out a series of operations on information passing through the pipelines, two or more pipeline stages each being provided with associated stall control circuitry which control the stalling of that pipeline stage, the control circuitry comprising:

a circuit portion which generates a hold signal for stalling the associated pipeline stage in response to either a local stall signal generated by that pipeline stage or a global stall signal generated by another pipeline;

a circuit portion which generates a global stall signal for stalling another pipeline in response to said local stall signal; and a circuit portion which delays the global stall signal such that the global stall signal is asserted a given number of clock cycles later than the hold signal is asserted, and the global stall signal is released the same number of clock cycles later than the hold signal is released.

BRIEF DESCRIPTION OF THE DRAWINGS

Preferred features of the present invention will now be described, purely by way of example, with reference to the accompanying drawings, in which:—

FIGS. 7 to 10 show one example of the operation of the second embodiment;

FIGS. 11 to 14 show another example of the operation of the second embodiment;

FIGS. 16 to 41 show examples of the operation of the third embodiment.

DETAILED DESCRIPTION OF THE INVENTION

First Embodiment

Figure 1:
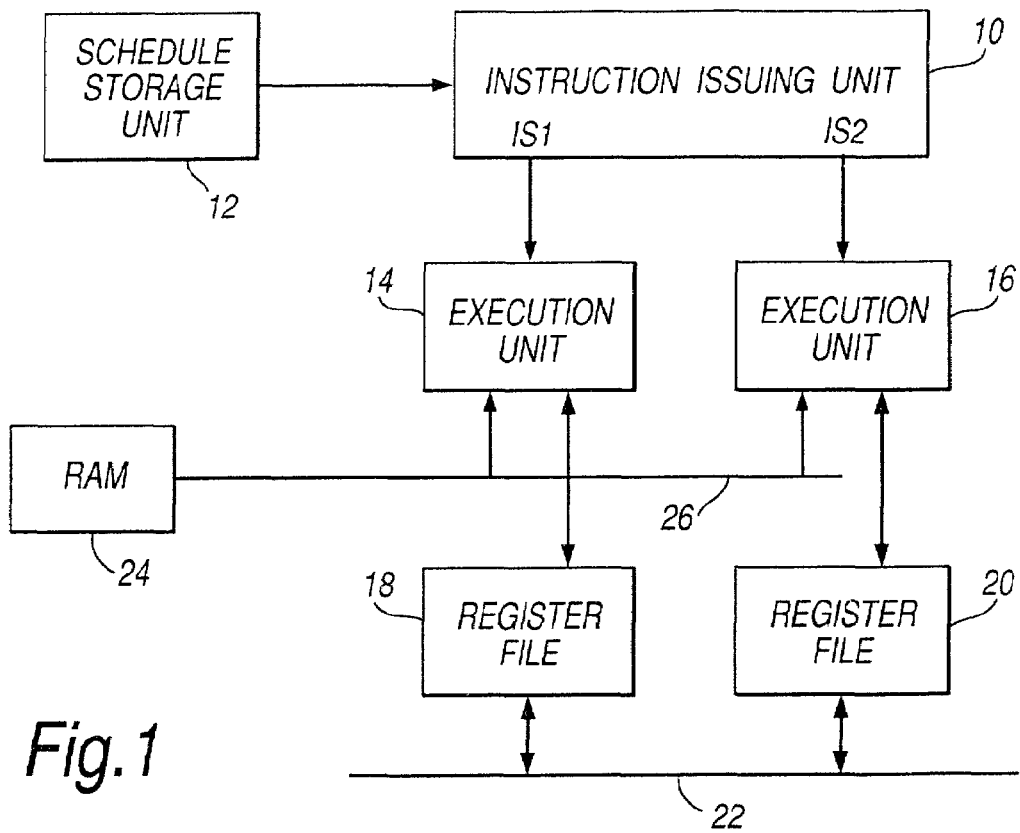
FIG. 1 is a block diagram of parts of a processor in a first embodiment of the present invention.

FIG. 1 is a block diagram of parts of a processor according to a first embodiment of the present invention. In this embodiment, the processor is a very long instruction word (VLIW) processor which is designed to execute long instructions which may be divided into smaller instructions.

Referring to FIG. 1, processor 1 comprises instruction issuing unit 10, schedule storage unit 12, first and second execution units 14, 16, and first and second register files 18, 20. The instruction issuing unit 10 has two issue slots IS1, IS2 connected respectively to the execution units 14, 16. The first execution unit 14 is connected to the first register file 18 and the second execution unit is connected to the second register file 20. The register files 18, 20 are connected to each other via a bus 22. As an alternative to two register files connected via a bus, a single register file could be provided instead. Each of the execution units 14, 16 is also connected to an external memory 24 via bus 26. In this example the external memory 24 is random access memory (RAM), although it may be any other type of memory.

In operation, an instruction packet for execution is passed from the schedule storage unit 12 to the instruction issuing unit 10. The instruction issuing unit 10 divides the instruction packet into its constituent instructions, and issues the two instructions to the execution units 14, 16 via the issue slots IS1 and IS2 respectively. The execution units 14, 16 then execute the various instructions simultaneously. In this way, different parts of a long instruction are processed in parallel.

Each of the execution units 14, 16 uses a pipelining technique to maximise the rate at which it processes instructions. Pipelining works by implementing each of a plurality of phases of instruction execution as a single pipeline stage. Instructions flow through successive pipeline stages, in a production-line fashion, with all partially-completed instructions moving one stage forward on each processor clock cycle. Instructions complete execution when they reach the end of the pipeline.

Figure 2:
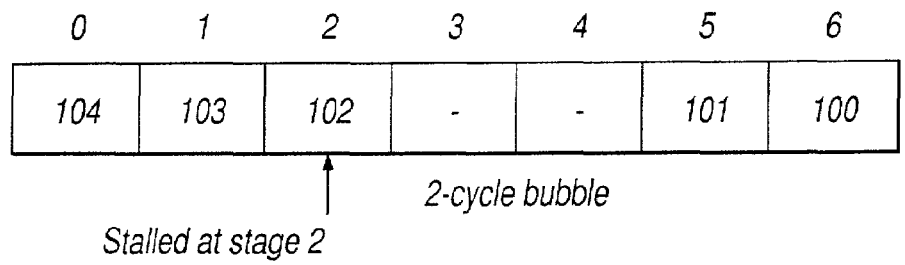
FIG. 2 is a representation of a seven stage pipeline.

FIG. 2 is a representation of a seven stage pipeline. In this representation, the content of each stage is the sequence number of the instruction which has reached that stage of the pipeline. The pipeline stages may include, for example, instruction fetch stages, instruction decode stages, and instruction execute stages. Instructions in the pipeline flow from left to right, from stages 0 to 6.

It is desirable to keep the pipeline full at all times, thus ensuring a high rate of instruction completion. However, it is possible that an instruction may not be able to progress through one of the stages in a single clock cycle for some reason, for example because it needs to access slow memory or to compute a multi-cycle operation. Such an event is known as a stall. When stage i stalls it prevents the instruction at stage i−1 from making forward progress, even if the instruction at stage i−1 is not itself stalled. This in turn stalls stage i−2 and so on up to stage 0 (the first stage). If stages 0 to i are stalled at time T, then at time T+1 stage i+1 will have no instruction to process. If the stall persists for another cycle, then at time T+2 stages i+1 and i+2 and will have no instructions to process. These empty pipeline stages are known as bubbles. In FIG. 2, a two-cycle bubble is shown in stages 3 and 4.

VLIW processors are designed such that instructions which are issued to different pipelines in parallel also complete their execution in parallel. If this rule were relaxed it would prove very difficult to stop a running process cleanly and to restart it at some later time. Thus, if there is a stall in one pipeline, each other pipeline must also stall to ensure that the various instructions exit the pipelines in parallel. For example, if there is a stall in the pipeline in execution unit 14 in FIG. 1, then the pipeline in execution unit 16 must also stall.

When there is a stall at stage i of a pipeline, a stall signal is generated by that stage. This stall signal is distributed to all stages from 0 to i−1 in the pipeline to cause them to stall before the next active edge of the pipeline clock.

One possible scheme for stalling the other pipeline in the FIG. 1 processor would be to take the logical OR of the stall signal from each stage of both pipelines and to distribute the result to both pipelines. However, this would require the transmission of a global stall signal to all pipeline stages before the next active edge of the pipeline clock. For high speed processors the delay in propagating such a global stall signal may restrict the operating clock frequency of the processor. Furthermore, if more pipelines were added in order to increase the processing rate, the physical distance the global stall signal would have to travel would increase, thereby restricting the operating clock frequency even further.

According to the first embodiment, instructions passing through the respective pipelines may get one stage out of step with each other, thus providing a full clock period for a stall signal to pass from one pipeline to the other.

Figure 3:
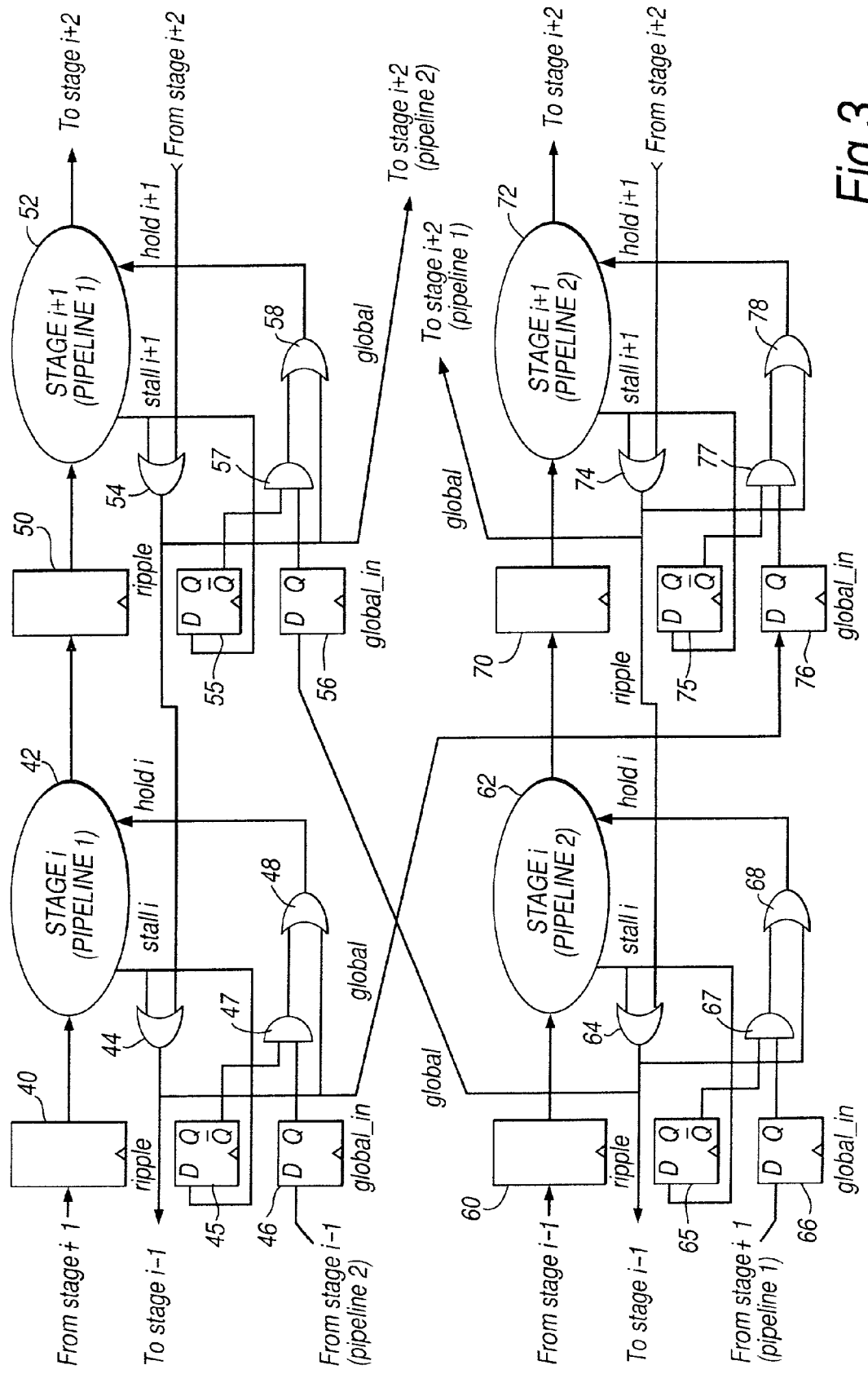
FIG. 3 shows parts of stall control circuitry in the first embodiment of the invention.

The operation of the first embodiment will now be described with reference to FIG. 3. FIG. 3 shows two stages, stage i and stage i+1, of a first pipeline (pipeline 1) and the corresponding stages of a second pipeline (pipeline 2). Stage i of pipeline 1 comprises pipeline register 40, processing circuit 42, OR gate 44, registers 45, 46, AND gate 47 and OR gate 48; stage i+1 of pipeline 1 comprises pipeline register 50, processing circuit 52, OR gate 54, registers 55, 56, AND gate 57 and OR gate 58; stage i of pipeline 2 comprises pipeline register 60, processing circuit 62, OR gate 64, registers 65, 66, AND gate 67 and OR gate 68; stage i+1 of pipeline 2 comprises pipeline register 70, processing circuit 72, OR gate 74, registers 75, 76, AND gate 77 and OR gate 78. In this example, registers 45, 55, 65, 75 and 46, 56, 66, 76 are implemented as D-type flip-flops. All clock inputs are fed by a common clock signal. Stages i and i+1 of pipeline 1 are part of the execution unit 14 in FIG. 1 and stages i and i+1 of pipeline 2 are part of the execution unit 16 in FIG. 1.

In normal operation, each processing circuit 42, 52, 62, 72 executes one phase of an instruction held in the corresponding register 40, 50, 60, 70. The stage i processing circuits 42 and 62 execute in parallel phase i of two instructions belonging to one VLIW packet and the stage i+1 processing circuits 52 and 72 execute simultaneously phase i+1 of two instructions belonging to another VLIW packet. On each clock cycle, the instructions held in the registers are passed to the next registers in the pipelines for further processing. In this way instructions flow through the pipelines with all partially completed instructions moving forward one stage on each clock cycle.

Each of the processing circuits 42, 52, 62, 72 is able to assert a stall signal if it requires the progress of the instruction it is executing to be stalled. The stall signals from processing circuits 42, 52, 62, 72 are fed to OR gates 44, 54, 64, 74 respectively. The outputs of the OR gates 44, 54, 64, 74 are fed to OR gates 48, 58, 68, 78 respectively. The OR gates 48, 58, 68, 78 output hold signals to processing circuits 42, 52, 62, 72 respectively. Thus, if one of the processing circuits asserts a stall signal, the hold signal of that processing circuit is asserted via the corresponding OR gates. If the hold signal input to a processing circuit is set, then that processing circuit will stall.

The output of each of the OR gates 44, 54, 64, 74 is also fed as a ripple signal to the corresponding OR gate in the previous stage in the same pipeline. The ripple signals thus ripple down the pipelines, so that if a processing circuit asserts a stall signal, the hold signals input to all previous processing circuits in the same pipeline are also asserted.

The output of each of the OR gates 44, 54, 64, 74 is also fed to the next stage of the other pipeline as a global signal. Each of the registers 46, 56, 66, 76 receives such a global signal from the previous stage of the other pipeline. For example, the output of OR gate 44 is fed to register 76 and the output of OR gate 64 is fed to register 56.

Each of the registers 46, 56, 66, 76 delays the signal at its input until the next clock cycle. Thus, the output of each of the registers 46, 56, 66, 76 is the global signal from the previous stage of the other pipeline, delayed until the next clock cycle. The outputs of the registers 46, 56, 66, 76 are fed via respective AND gates 47, 57, 67, 77 to respective OR gates 48, 58, 68, 78, which output hold signals to processing circuits 42, 52, 62, 72 respectively. Thus, assuming the other inputs to the AND gates 47, 57, 67, 77 are set, if a processing circuit asserts a stall signal, the hold signal input to the next processing circuit in the other pipeline will be asserted in the next clock cycle.

The stall signals of processing circuits 42, 52, 62, 72 are also fed to registers 45, 55, 65, 75 respectively. The inverting outputs of registers 45, 55, 65, 75 are fed to AND gates 47, 57, 67, 77 respectively. Thus, the output of each of the AND gates 47, 57, 67, 77 is reset if the corresponding processing circuit asserted a stall signal in the previous clock cycle, regardless of the state of registers 46, 56, 66, 76. This prevents the registers 46, 56, 66, 76 from generating a stall signal if the corresponding pipeline stage stalled in the previous clock cycle due to a locally generated stall signal. In this way, if the two pipelines generate a stall signal in the same clock cycle, only one stall is implemented.

As an example, if processing circuit 42 sets the stall signal in a given clock cycle, then OR gates 44 and 48 ensure that the hold signal of that stage is set. A ripple signal flows to all stages i−1 to 0 via the corresponding OR gates of those stages, causing each of those stages to set the hold signal. Thus, a hold signal is set at all stages 0 to i of the first pipeline before the next active edge of the pipeline clock, causing those stages to stall. However, because the output of OR gate 44 is delayed by register 76, the hold signal input to processing circuit 72 is not set until the next but one active edge of the pipeline clock. Similarly, the hold signal input to processing circuit 62 is delayed by one clock cycle due to register 66, and so on until stage 1 of the second pipeline. Thus, stages 0 to i+1 of the second pipeline stall one clock cycle later than stages 0 to i of the first pipeline. It is necessary to stall stages 0 to i+1 of the second pipeline because the instructions in that pipeline will have advanced one stage while the instructions in the first pipeline are stalled. Stage 0 of a pipeline is arranged to stall when stage 1 of that pipeline stalls.

While the stall signal from processing circuit 42 remains set, the hold signal to stages 0 to i of the first pipeline and stages 0 to i+1 of the second pipeline remain set, causing those stages to remain stalled. When the stall signal is released, the hold signals to stages 0 to i of the first pipeline are also released, so that normal operation resumes in that pipeline. However, due to the operation of the registers 66, 76 (and the corresponding registers in previous pipeline stages), the hold signals to stages 0 to i+1 of the second pipeline are only released on the next clock cycle. Thus in the second pipeline normal operation resumes on the next clock cycle. This one cycle delay in releasing the stall allows the two pipelines to get back into step with each other.

Thus it will be seen that individual instructions within the two pipelines may become out of step by one cycle, thereby providing a full clock period for stall signals to propagate between the pipelines.

The first embodiment has the following main features:
1. Either of the pipelines can assert a stall signal in any cycle that is not itself the subject of a stall.
2. Stages prior to a stalling stage that are in the same pipeline will stall in the same cycle as the stalling stage, but stages in the other pipeline will be stalled one cycle later.
3. When a stall is released, all stalled stages in that pipeline make forward progress immediately, but stalled stages in the other pipeline are released one cycle later. The net effect of this is that the stalled operations return to alignment after being out-of-step by one stage during the stall.
4. The logic to control the stalling of each stage is local to that stage. A full clock cycle is available to distribute the global stall signal to the other pipeline.

It will be noted that the last stage of a pipeline is not able to assert a stall signal, because it would not then be able to stall the other pipeline in time to prevent the instruction in the last stage from exiting the pipeline. This may be dealt with, either by arranging the processor and the instruction set such that the last stage of a pipeline never needs to assert a stall signal, or by adding a final dummy stage to each pipeline.

If desired, a delay of two or more clock cycles may be introduced for the propagation of stall signals between the pipelines, by arranging the registers 45, 55, 65, 75 and 46, 56, 66, 76 to delay the signals at their inputs by two or more clock cycles. For example, two or more D-type flip-flops connected in series may be used in place of each flip-flop 45, 46, 55, 56, 65, 66, 75, 76 in FIG. 3. In this case, the processor may ensure that the last m stages of the pipeline do not assert a stall signal, where m is the number of clock cycles delay, or a number m of dummy stages may be added, or a combination of the two approaches may be used.

Second Embodiment

Figure 4:
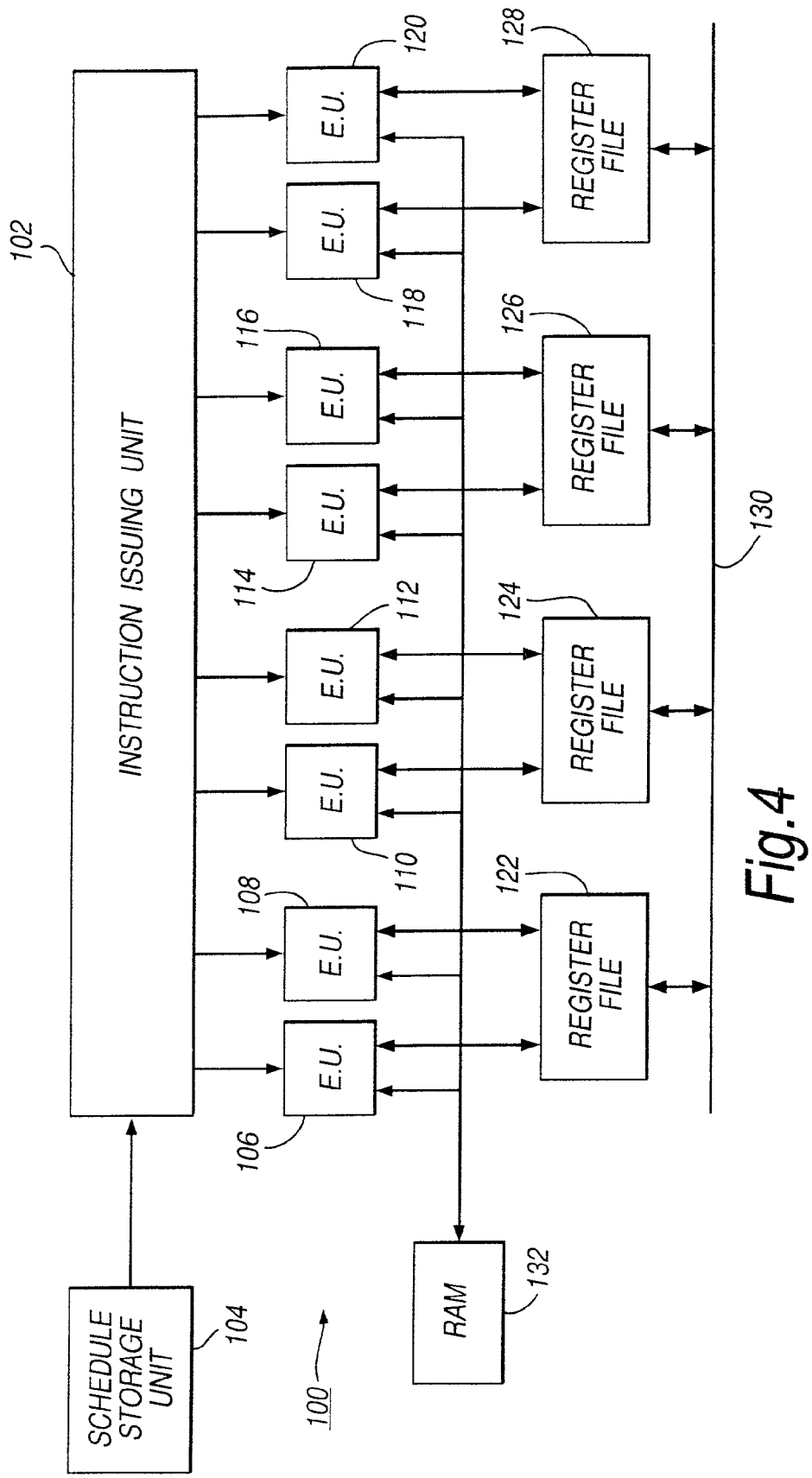
FIG. 4 is a block diagram of parts of a processor in a second embodiment of the present invention.

FIG. 4 shows parts of a processor according to a second embodiment. Referring to FIG. 4, processor 100 comprises an instruction issuing unit 102, a schedule storage unit 104, first to eighth execution units (E.U.) 106, 108, 110, 112, 114, 116, 118, 120 and first to fourth register files 122, 124, 126, 128. The instruction issuing unit 102 has eight issue slots IS1 to IS8 connected respectively to the execution units 106 to 120. The first and second execution units 106, 108 are connected to the first register file 122, the third and fourth execution units 110, 112 are connected to the second register file 124, the fifth and sixth execution units 114, 116 are connected to third register file 126, and the seventh and eighth execution units 118, 120 are connected to the fourth register file 128. Each of the execution units is also connected to an external memory 132, such as a RAM device, via bus 134.

In operation, an instruction packet (VLIW packet) for execution is passed from the schedule storage unit 104 to the instruction issuing unit 102. The instruction issuing unit 102 divides the instruction packet into its constituent instructions, and issues the instructions to the execution units 106 to 120 via issue slots IS1 to IS8. The execution units 106 to 120 then execute the various instructions belonging to the packet simultaneously.

The execution units 106 to 120 are divided into four groups, with each group having its own register file. This is done in order to reduce the number of access slots to any one register file. If a single register file were provided, the register file may have too many access slots, which would increase access time to the register file. Each group of execution units with a common register file may be referred to as a cluster. In FIG. 4, a first cluster is formed by execution units 106, 108 and register file 122, a second cluster is formed by execution units 110, 112 and register file 124, a third cluster is formed by execution units 114, 116 and register file 126, and a fourth cluster is formed by execution units 118, 120 and register file 128. If a value held in one cluster is required in another cluster, the value is transferred between the clusters via a bus 130. While four clusters are shown in FIG. 4, more or fewer clusters may be provided as required. Each cluster may have one, two or more execution units.

As in the first embodiment, each of the execution units 106 to 120 uses pipelining to increase the rate at which it processes instructions. Pipelines within a cluster stay in step with each other, whereas pipelines in different clusters are allowed to get one or more cycles out of step with each other.

Figure 5:
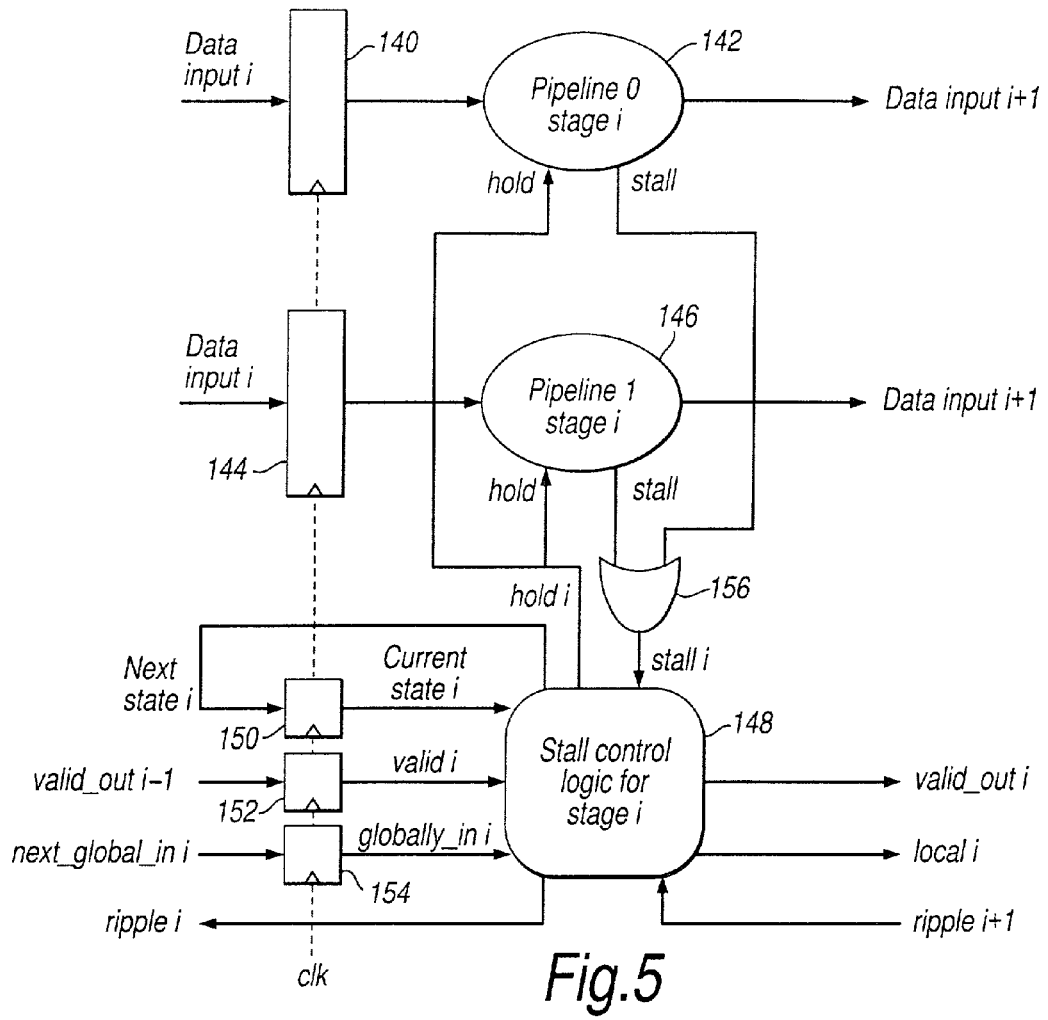
FIG. 5 shows parts of stall control circuitry in the second embodiment.

FIG. 5 shows the block structure of the ith stage in a two pipeline cluster. Stage i of the cluster comprises stage i of the first pipeline in the cluster (pipeline 0), stage i of the second pipeline in the cluster (pipeline 1), and common control circuitry for controlling the two pipeline stages. Stage i of pipeline 0 comprises pipeline register 140 and processing circuit 142, and stage i of pipeline 1 comprises pipeline register 144 and processing circuit 146. The control circuitry is formed by stall control logic 148, registers 150, 152, 154 and OR gate 156.

In operation, stage i of the cluster can be either active, or stalled by a stage j in the same cluster, where $j \geq i$, or stalled by a stage l in another cluster where $l \geq i-1$. Hence, stage i of the cluster has a state variable CurrentState i, which indicates whether the stage is active (A), locally stalled (L) or globally stalled (G).

The value of the variable CurrentState i is held in register 150. The input to register 150 is a signal NextState i which determines which state the stage will be in in the next clock cycle.

The behaviour of the stall control logic 148 is governed by a set of state transitions, as shown in Table 1. In Table 1, each row represents a possible transition that can be made and explicitly states the conditions under which it can take place. Each transition is from the current state to the next state, and will take place if the stage in question is in the current state for a given transition and the values of the boolean variables local and global_in are as indicated in the entry for that transition. The local variable is set when there is a local stall, i.e. one that originates in the local cluster. This is true whenever the current stage has a pending stall or if any stage after the current stage will be in the locally stalled state in the next cycle. The global_in variable is set if any other cluster asserted its local signal in the previous cycle.

TABLE 1

| Transition | Current State | global_in | local | Next State |
|---|---|---|---|---|
| 1 | A | 0 | 0 | A |
| 4 | A | 0 | 1 | L |
| 6 | A | 1 | 0 | G |
| 6 | A | 1 | 1 | G |
| 5 | L | 0 | 0 | A |
| 3 | L | 0 | 1 | L |
| 5 | L | 1 | 0 | A |
| 3 | L | 1 | 1 | L |
| 7 | G | 0 | 0 | A |
| 8 | G | 0 | 1 | L |
| 2 | G | 1 | 0 | G |
| 2 | G | 1 | 1 | G |

Figure 6:
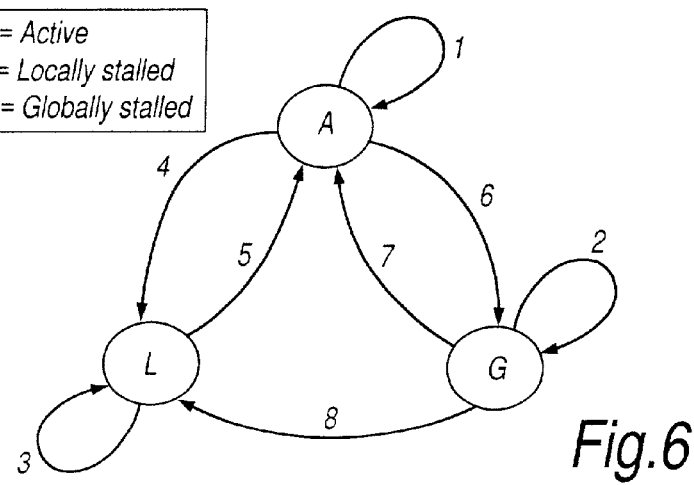
FIG. 6 is a state transition diagram showing the operation of part of the pipeline stage of FIG. 5.

A state transition diagram for the behaviour of each pipeline stage is shown in FIG. 6. In FIG. 6, transition numbers correspond to the numbers in the first column of Table 1. As will be apparent to the skilled person, the appropriate logic circuits may be derived routinely from the state transition diagram and/or table, and are accordingly not described specifically herein.

In operation, pipeline register 140 holds instructions and data for execution by processing circuit 142 and pipeline register 144 holds instructions and data for execution by processing circuit 146. If the phase of an instruction being executed in clock cycle T by one of the processing circuits 142, 146 in FIG. 5 requires more than one cycle for execution, then that processing circuit asserts a stall signal. The stall signals from stage i of both pipelines are fed to OR gate 156. The output of OR gate 156 is a signal stall i, which indicates whether stage i of one or more of the pipelines in that cluster has asserted a stall signal. The signal stall i is fed to stall control logic 148.

Based on the stall i signal, the stall control logic 148 generates a signal local i, as follows:

local $i$=(stall $i$ OR ripple $i$+1)

The signal ripple i is set whenever the next state of stage i of the cluster will be L (i.e. locally stalled). Hence:

ripple $i$=(NextState $i$=L)

The signal ripple i+1 is the corresponding signal generated by stage i+1 of the cluster.

If ripple i is asserted during cycle T, then ripple i−1, i−2, . . . , i−k will also be asserted in the same cycle as a consequence of the local stall in stage i. The ripple-down of the localised stall signal will terminate at the left-most end of the pipeline, or earlier if some stage will not be in the L stage in cycle T+1 (i.e. NextState i−k≠L). This could be caused by a localised stall in another cluster at stage i−k−1 which was present in cycle T−1 and caused the global_in signal at stage i−k to be asserted in cycle T.

The NextState i signal is generated based on the local i signal, the CurrentState i signal and the global_in i signal, as shown in the final column of Table 1. On the next active edge of the clock, the signal NextState i is registered in register 150, so that the signal CurrentState i in cycle T+1 is equal to the signal NextState i in cycle T.

If the value of NextState i in any clock cycle is either L or G (corresponding to locally or globally stalled) then the hold i signal is asserted. In response, the instructions and data in registers 142 and 144 remain the same in the next clock cycle.

The various clusters communicate their stall statuses to each other via the ripple and global_in signals. The next_global_in i signal for cluster C is the logical OR of the ripple i−1 signals from all clusters except C. The next_global_in i signal is registered at the end of every clock period in register 154 to give the signal global_in i. The global_in signals for stage 0 of all clusters are always false. In each pipeline, stage 0 is arranged to stall when stage 1 of that pipeline stalls.

For example, if the phase of the instruction being executed in cycle T by a processing circuit in stage h (h≥i−1) of another cluster requires more than one clock cycle, then its local h signal is asserted in cycle T. This causes the next_global_in signals of all stages 1 to h+1 in all other clusters to be asserted before the end of cycle T. This in turn causes the global_in i signal of stall control logic 148 to be asserted in cycle T+1.

The valid i signal is used to indicate that a bubble is present in stage i of the cluster. For example, if stage i−1 is stalled, then the signal valid_out i−1 is set false, indicating that there is a bubble in stage i−1. On the next clock cycle, the signal valid_out i−1 is registered by register 152 to give the signal valid i. If valid i is set false, processing circuits 142, 146 ignore the instructions in registers 140, 144.

Thus it can be seen that the second embodiment provides a distributed stalling scheme, in which each stage determines locally whether it needs to stall the processor at each cycle of program execution and asserts stall i if a stall at stage i is required. If the stall logic for stage i determines that any one of the three causes of a stall requires that stage i be stalled in the current cycle then it asserts the hold i signal. In response, stage i retains the instruction and data in its input register.

The second embodiment has the following main features:
1. Any pipeline stage in any cluster can assert a stall signal in any cycle that is not itself the subject of a stall.
2. Stages prior to a stalling stage that are in the same cluster will stall in the same cycle as the stalling stage, but stages in other pipelines will be stalled one cycle later.
3. When a stall is released, all stalled stages in that cluster make forward progress immediately, but stalled stages in other clusters are released one cycle later.
4. The logic to control the stalling of each stage is local to that stage. Where stall signals are communicated globally (from one cluster to another) a full clock cycle is available to compute the global stall condition and to distribute it to all clusters.

An example of the operation of the second embodiment will now be described with reference to FIGS. 7 to 10. FIG. 7 shows the situation where a stall occurs in stage 3 on instruction packet 103 in cluster 1 at time T=1. At this time cluster 1 stalls immediately from stage 3 to stage 0 whereas other clusters are not stalled.

FIG. 8 shows the situation one cycle later at T=2. Because of the one-cycle delay to inform other clusters that they should stall at stage 3, it is not until this time that the other clusters are stalled. By that time instruction packet 103 has moved on to stage 4, so the stall must take effect from stage 4 in those clusters. Also in this clock cycle, the stall in cluster 1 is released, and so the instructions in cluster 1 are free to make forward progress in the next clock cycle.

FIG. 9 illustrates the situation one cycle later at time T=3. In cluster 1, instruction packets 103 to 106 have moved forward and packet 107 has been inserted, while the instructions in clusters 0, 2 and 3 have not moved due to the delay in releasing the global stall. Thus the instructions in all clusters are realigned in this clock cycle. As shown in FIG. 10, one cycle later at time T=4, the instructions in all clusters are free to make forward progress as normal.

Another example of the operation of the second embodiment, in which a stall signal is generated by two different clusters, will now be described with reference to FIGS. 11 to 14. In this example, a local stall signal is generated by both stage 3 in cluster 1 and stage 1 in cluster 2 at time T=1.

Referring to FIG. 11, at time T=1, stages 3 to 0 of cluster 1 and stages 1 and 0 of cluster 2 have the local signal set and the global_in signal reset, so that, referring to Table 1 (transition 4), the next state of these stages will be locally stalled (L).

One cycle later at time T=2 (FIG. 12), stages 3 to 0 of cluster 1 and stages 1 and 0 of cluster 2 are in the locally stalled state, while the other stages are in the active state (A). Bubbles thus form in stage 4 of cluster 1 and stage 2 of cluster 2. Also at time T=2, stages 4 to 0 of clusters 0, 2 and 3, and stages 2 to 0 of cluster 1, have their global_in signals set, due to the stalls that occurred in clusters 1 and 2 in the previous cycle. In this example the stalls only last for one cycle. Thus, referring to Table 1, the next state of stages 4 to 0 of clusters 0 and 3 and stages 4 and 3 of cluster 2 will be globally stalled (G) while the next state of stages 3 to 0 in cluster 1 and 1 to 0 in cluster 2 will be active (A).

At time T=3 (FIG. 13) stages 4 to 0 of clusters 0 and 3 and stages 4 and 3 of cluster 2 are in the globally stalled state. Stages 1 to 0 of cluster 2 are in the active state, and hence the instructions that were in these stages move forward one stage to fill in the bubble that occurred in stage 2 of cluster 2 at time T=2. Since stages 3 and 4 of cluster 2 are in the globally stalled state, a new bubble forms at stage 5 of cluster 2. Bubbles also form in stage 5 of clusters 0 and 3, due to stages 4 to 0 being in the globally stalled state. The bubble that was in stage 4 of cluster 1 moves forward to stage 5 of cluster 1, since the whole of cluster 1 is in the active state. Thus, in this clock cycle the instructions in all of the pipelines are realigned. Also in this clock cycle the remaining stalls in clusters 0, 2 and 3 are released (i.e. the next state is active). FIG. 14 shows the situation at T=14 with forward progress being made in all clusters as normal.

It will be noted from the above that, if a stall signal is generated in two different clusters in the same clock cycle, this only results in one bubble occurring in the pipelines. This is because, if a stage has its current state as locally stalled (L), and the local signal is not set, the next state of that stage is active (A), regardless of whether or not the global_in signal is set. This is indicated by transition 5 in Table 1 and FIG. 6.

In the above examples, it is assumed that a stall is released one clock cycle after it is initiated, so that bubbles of one stage form. However, a stall may last for an indefinite period of time, and thus bubbles of two or more stages may form, depending on the number of clock cycles for which a stall lasts.

As in the first embodiment, the delayed stalling scheme of the second embodiment will not permit stalls to originate in the final stage. This may be dealt with either by arranging the processor and the instruction set such that the last stage of a pipeline never needs to assert a stall signal, or by adding a final dummy stage to each pipeline, or both.

As in the first embodiment, the delay in distributing a global stall signal between clusters may be one or more clock cycles.

Third Embodiment

Figure 15:
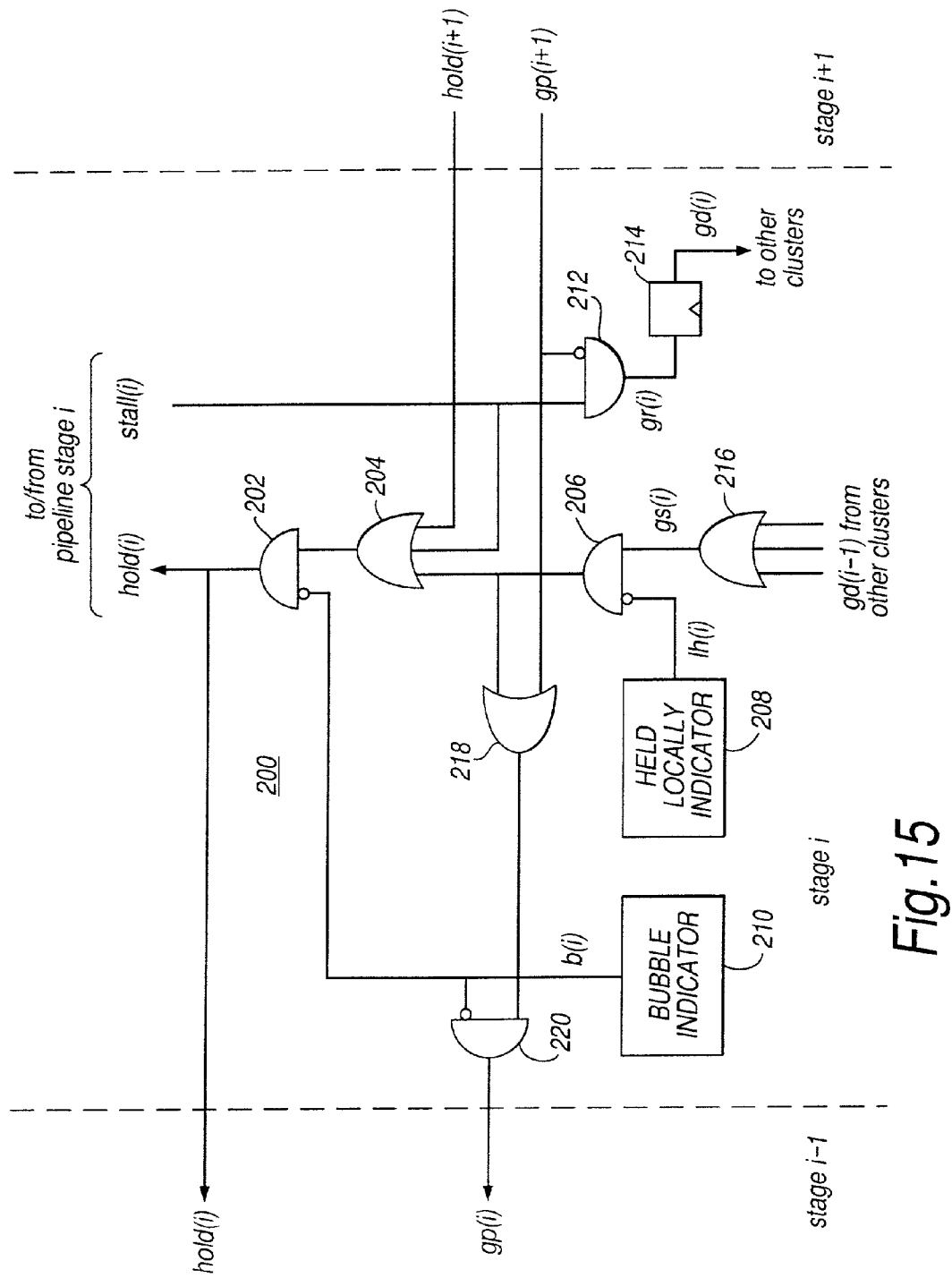
FIG. 15 shows parts of stall control circuitry in a third embodiment of the invention.

FIG. 15 shows parts of the stall control circuitry in a third embodiment of the invention. The circuitry 200 shown in FIG. 15 is for a pipeline stage i in a cluster p; similar circuitry is provided for other pipeline stages and in other clusters. The circuitry 200 receives a signal stall(i) from pipeline stage i in cluster p indicating that the instruction in that stage has asserted a stall, and generates a signal hold(i) indicating that pipeline stage i in cluster p is to stall. Where two or more pipelines are provided per cluster, hold(i) is issued in common to stage i of all pipelines in the cluster, and stall(i) is formed from the logical OR of the stall signals from stage i of all pipelines in the cluster.

Referring to FIG. 15, the stall control logic 200 comprises AND gate 202 having one inverting and one non-inverting input, OR gate 204, AND gate 206 having one inverting and one non-inverting input, held locally indicator 208, bubble indicator 210, AND gate 212 having one inverting and one non-inverting input, register 214, OR gate 216, OR gate 218 and AND gate 220 having one inverting and one non-inverting input.

For convenience, the signals shown in FIG. 15 are briefly described below:

b(i) is a signal indicating whether pipeline stage i contains a bubble. This signal corresponds to the inverse of the signal valid i in the second embodiment.

lh(i) is a signal indicating whether pipeline stage i is held locally, i.e. stalled in response to a locally generated stall signal in the previous cycle.

gs(i) is a signal which is asserted when there is a global stall from pipeline stage i−1 in another cluster.

stall(i) is a signal indicating whether a stall is being asserted internally in pipeline stage i.

hold(i) is a signal indicating whether pipeline stage i is to be stalled. Hold(i) is also fed to pipeline stage i−1, to provide the mechanism by which stall requests are propagated back to earlier pipeline stages.

gp(i) is a signal which is used to indicate that a global stall request from another cluster is being propagated back to pipeline stage i−1.

gr(i) is a global stall request signal which is sent to stage i+1 of the other clusters indicating that they should stall in the next cycle gd(i) is a delayed global request signal, delayed by one clock cycle to allow time for the signal to propagate between clusters.

In operation the signal hold(i) is asserted, indicating that pipeline stage i is to be stalled on the next clock cycle, if pipeline stage i does not contain a bubble, and one of the following conditions is true:

a stall is asserted locally within pipeline stage i pipeline stage i+1 in the same cluster is stalled pipeline stage (i−1) in another cluster was stalled in the previous cycle and the current pipeline stage is not already held locally.

This is achieved by AND gate 202, OR gate 204, AND gate 206, locally held indicator 208 and bubble indicator 210.

Bubble indicator 210 outputs a signal b(i) which is true if stage i contains a bubble. The state transition table of the bubble indicator 210 is shown below in Table 2.

TABLE 2

| b (i) | hold (i−1) | hold (i) | next b (i) |
|---|---|---|---|
| 0 | 0 | 0 | b (i−1) |
| 0 | 0 | 1 | 0 |
| 0 | 1 | 0 | 1 |
| 0 | 1 | 1 | 0 |
| 1 | 0 | 0 | b (i−1) |
| 1 | 0 | 1 | n/a |
| 1 | 1 | 0 | 1 |
| 1 | 1 | 1 | n/a |

It can be seen that next b(i) is set (indicating that stage i will have a bubble in the next clock cycle) if stage i−1 is stalled and stage i is not stalled. If neither stage i nor stage i−1 are stalled, then the value of b(i) is passed to the next pipeline stage. This is indicated by next b(i) being equal to b(i−1) in rows 1 and 5 of Table 2.

Locally held indicator 208 outputs a signal lh(i) which is true if pipeline stage i is locally held. Stage i is said to be held locally if it was stalled in response to its own locally generated stall signal in the previous cycle. The state transition table of the locally held indicator 208 is shown below in Table 3.

TABLE 3

| lh (i) | gs (i) | stall (i) | next lh (i) |
|---|---|---|---|
| 0 | 0 | 0 | 0 |
| 0 | 0 | 1 | 1 |
| 0 | 1 | 0 | 0 |
| 0 | 1 | 1 | 0 |
| 1 | 0 | 0 | 0 |
| 1 | 0 | 1 | 1 |
| 1 | 1 | 0 | 0 |
| 1 | 1 | 1 | 1 |

It can be seen that next lh(i) (i.e. the value that lh(i) is to take in the next clock cycle) is set whenever there is a locally generated stall, except if there is a global stall and lh(i) is currently reset. In this case, there is no need to generate a local stall because there is already a global stall.

In the third embodiment, a global stall request gr(i) is sent to all other clusters to cause those clusters to stall from pipeline stage i+1 one cycle later if both of the following conditions are true:

a stall is asserted locally at pipeline stage i no global stall is being propagated from pipeline stages k, where k>i.

Thus pipeline stage i generates a global stall request gr(i) if a stall is asserted locally at that pipeline stage, and that pipeline stage is not subject to a global stall which also has effect in one or more later stages. This is achieved by AND gate 212.

The signal gr(i) is delayed by one clock cycle in register 214, to produce delayed stall request signal gd(i). Pipeline stage i collects the delayed stall request signals from the previous pipeline stage in the other clusters and combines them in OR gate 216 to yield the global stall signal gs(i).

As mentioned above, pipeline stage i does not produce a global stall request if a global stall from another cluster is being propagated down the pipeline from later pipeline stages. This prevents a second global stall from being generated in those stages which are already subject to a global stall from another cluster. This allows instructions in a cluster which has already been the subject of a local stall (and which generated the original global stall) to make forward progress when that local stall is released. Those instructions can then move forward into the bubble which was formed when the local stall was first asserted, so that the various clusters are brought back into alignment.

In order to determine whether a global stall is being propagated from a later stage, the signal gp(i) is sent from stage i to stage i−1. The signal gp(i) is set when pipeline stage i does not contain a bubble and at least one of the following conditions is true:

a global stall from another cluster is applied to this pipeline stage and this stage is not locally held.

a global stall from another cluster is propagated to this pipeline stage from stage i+1.

This is achieved by OR gate 218 and AND gate 220 in FIG. 15.

Operation of the third embodiment will now be illustrated using various examples of different stalling conditions.

FIGS. 16 to 20 show how a two cycle stall is handled. FIG. 16 shows the situation at this time T=1. At this time stage 3 of cluster 1 asserts its stall signal. Cluster 1 stalls immediately from stage 3 to stage 0, as indicated by the hatching in the figure. However, the other clusters do not stall at this time because of the one cycle delay in distributing the global stall signal.

FIG. 17 shows the situation one clock cycle later at T=2. Clusters 0, 2 and 3 are now stalled from stage 4 due to the delayed global stall signal. A bubble has formed in stage 4 of cluster 1, since the instructions which were in stages 4, 5 and 6 of this cluster have moved on one stage, while the instructions stages 0, 1, 2 and 3 are stalled. It is assumed that the stall signal in stage 3 of cluster 1 is still asserted in this clock cycle.

FIG. 18 shows the situation in the next clock cycle at T=3. Cluster 1 was still held from stage 3, and so a further bubble has appeared in stage 3 of that cluster. Clusters 0, 2 and 3 are held from stage 4, and bubbles appear in stage 5 of those clusters. It is assumed that the stall is resolved in this clock cycle. The stall is therefore removed from cluster 1, so that the instructions in that cluster are free to make forward progress in the next clock cycle. However, clusters 0, 2 and 3 remain stalled from stage 4 due to the one cycle delay in the global stall signal.

FIG. 19 shows the situation at T=4. Because the stall was removed from cluster 1 in the previous cycle, the instructions in cluster 1 all move forward one stage. However, because clusters 0, 2 and 3 were stalled from stage 4, the instructions in stages 0 to 4 of those clusters do not move, and a further bubble appears in stage 5. This brings the various clusters back into alignment. FIG. 20 shows the situation at T=5 with all instructions proceeding in lock step as usual.

FIGS. 21 to 24 illustrate how the stall control logic responds to multiple stall requests which are asserted simultaneously by the same pipeline stages in different clusters. It is assumed that clusters 1 and 3 both assert a two-cycle stall signal in stage 3 at the same time. FIG. 21 shows the situation at time T=1 when the stalls are asserted. Clusters 1 and 3 are both stalled immediately from stage 3. FIG. 22 shows the situation at time T=2. The stalls in clusters 1 and 3 are maintained, and clusters 0 and 2 are both stalled from stage 4. FIG. 23 shows the situation at time T=3. The stalls are removed from clusters 1 and 3, but not from clusters 0 and 2. FIG. 24 shows the situation at time T=4. The instructions in clusters 1 and 3 have now moved forward so that they are realigned with the instructions in clusters 0 and 3. The stalls have been removed from clusters 0 and 3, so that the instructions in all clusters are free to make forward progress as usual on the next clock cycle.

FIGS. 25 and 26 illustrate how multiple stall requests are handled if different clusters release their stall requests at different times. It is assumed that clusters 1 and 3 both asserted a stall signal in stage 3 at time T=1, as shown in FIG. 21, and that clusters 0 and 2 were stalled one cycle later, as shown in FIG. 22. FIG. 25 shows the situation at T=3. In this cycle cluster 1 resolves its stall, and therefore is no longer subject to a local stall. However cluster 3 maintains its stall, and therefore also maintains the global stall signal which is distributed to the other clusters. Since cluster 1 is no longer locally stalled, it is necessary for the instructions in stages 0 to 3 of cluster 1 to advance by one stage to bring them into alignment with the instructions in clusters 0 and 2. This is so that all clusters will be in alignment when the stall in cluster 3 is released. Therefore, cluster 1 is not stalled in this clock cycle. As was described above with reference to FIG. 15, this is achieved by arranging stage i of a cluster only to be stalled by a global stall from stage i−1 of another cluster if that stage is not held locally.

FIG. 26 shows the situation at time T=4. The instructions in cluster 1 have been allowed to advance by one stage, so that they are now in alignment with the instructions in clusters 0 and 2. In this cycle, the signal lh (locally held) in cluster 1 is no longer true, and so the global stall from cluster 3 is now applied to cluster 1 as well as clusters 0 and 2. The various clusters then re-attain alignment in the usual way when the stall in cluster 3 is released at some time in the future.

FIGS. 27 to 30 illustrate operation of the stall control logic when multiple stall requests are asserted simultaneously from different stages of different clusters. It is assumed that stall requests are asserted simultaneously in stage 4 of cluster 0 and stage 2 of cluster 2. These two clusters stall immediately at time T=1, as shown in FIG. 27.

FIG. 28 shows the situation at time T=2. Clusters 1, 2 and 3 are stalled from stage 5 due to the stall in stage 4 of cluster 0. A bubble has formed in stage 5 of cluster 0 due to this stall. A bubble has also formed in stage 3 of cluster 2 because the internal stall in this cluster at stage 2 did not stop instructions in packet 102 and 103 from advancing.

FIG. 29 shows the situation at a later time, T=6, when it is assumed that the stalls in clusters 0 and 2 are both released simultaneously. The stall is released immediately in all stages of cluster 0. However, in cluster 2, the stall is only released from stages 2, while stages 4 and 5 remain stalled. This is because stages 0, 1 and 2 of cluster 2 were held locally, while stages 4 and 5 were not. As was described above with reference to FIG. 15, a pipeline stage is only stalled in response to a global stall signal if it is not held locally.

FIG. 30 shows the situation at time T=7. The instructions in cluster 2 that were previous in stages 0 to 2 have advanced to stages 1 to 3, thereby removing the bubble that was previously in stage 3. Similarly, the instructions in cluster 0 that were previous in stages 0 to 4 have advanced to stages 1 to 5, so that all clusters are now re-aligned. All of the stalls have been removed, so that the instructions in all clusters are free to make forward progress as usual on the next clock cycle.

FIGS. 31 and 32 show how the stall requests are handled if the requests are not released at the same time. FIG. 18 shows the situation at T=6, where it is assumed that only the internal stall in cluster 2 is released. Consequently, the stall is released from stage 3 in this cluster, while stages 4 and 5 remain stalled. FIG. 32 shows the situation at time T=7. The bubble at stage 3 in cluster 2 has been eliminated because the instructions in stage 2 and earlier have moved forward. Clusters 1, 2 and 3 are now all stalled in response to the stall signal from stage 4 of cluster 0. The various clusters then realign in the usual way when the stall in cluster 0 is released at some time in the future.

FIGS. 33 and 34 show how the above situation would change if the stall in cluster 0 were released before the stall in cluster 2. It is assumed that the stall in cluster 0 is released at T=6, as shown in FIG. 33. Consequently, in this cycle cluster 0 is not stalled, while clusters 1, 2 and 3 are stalled from stage 5. Without its internal stall, cluster 0 must be realigned with clusters 1 and 3 so that all clusters will be in alignment when cluster 2 releases its stall.

FIG. 34 shows the situation at T=7. The instructions in cluster 0 have moved forward one stage, so that cluster 0 is now realigned with clusters 1 and 3. Clusters 0, 1 and 3 are stalled from stage 3 in response to the stall signal from stage 2 of cluster 2. The various clusters then realign in the usual way when the stall in cluster 2 is released at some time in the future.

FIGS. 35 to 41 show two further sequences in which staggered stall requests are generated.

FIG. 35 shows the situation at time T=1 when a stall is asserted at stage 3 in cluster 1. FIG. 36 shows the situation at T=2, when all other clusters are stalled by the resulting delayed stall from cluster 1.

At this time, stage 4 in cluster 3 also asserts a stall. This new stall request from cluster 3 does not need to be communicated to any other clusters while those clusters are already stalled. As was discussed above with reference to FIG. 15, a pipeline stage generates a global stall request if a stall is asserted locally at that pipeline stage, and that pipeline stage is not subject to a global stall from the same stage or later in another cluster. Thus, for as long as the global stall from cluster 1 is asserted, cluster 3 does not produce a global stall request in response to the local stall in stage 4. Indeed, if the stall in cluster 3 is released before the stall in cluster 1, the entire processor behaves as if a stall had only been raised from cluster 1 at time T=1.

FIG. 37 shows the situation at T=3. At this time, the internal stall requests in clusters 1 and 3 are released simultaneously. Consequently, the stall in cluster 1 is released immediately. However cluster 3 remains stalled because the delayed global stall from cluster 1 is still active. FIG. 38 shows the situation at T=4. Cluster 1 has now realigned with all other clusters, and the stalls in all clusters are released. The instructions in all clusters then make forward progress as usual in the next clock cycle.

FIGS. 39 to 41 show how the above situation would change if the stall in cluster 1 were released before the stall in cluster 3. FIG. 39 shows the situation at T=3. At this time, the internal stall in cluster 1 is released, but not the internal stall in cluster 3. Since cluster 3 did not generate a global stall, cluster 1 is now not subject to any stall.

FIG. 40 shows the situation at T=4. The instructions in cluster 1 have moved forward, so that cluster 1 is now realigned with the other clusters. The global stalls which originated from cluster 1 have now been removed from clusters 0 and 2. However, cluster 3 remains stalled by its own internal stall. At this time, since cluster 3 is still subject to a local stall but not to a global stall, a global stall request is generated by cluster 3. This global stall request is delayed by one clock cycle (by register 214 in FIG. 15) so that it will take effect in the other clusters one clock cycle later.

FIG. 41 shows the situation one clock cycle later at T=5. The instructions in clusters 0, 1 and 2 have moved forward one stage, and the global stall from cluster 3 is now applied to clusters 0, 1 and 2 from stage 5. From this point onwards, the various clusters realign in the usual way when the stall in cluster 3 is released at some time in the future.

Although the above description relates, by way of example, to a VLIW processor it will be appreciated that the present invention is applicable to processors other than VLIW processors. A processor embodying the present invention may be included as a processor "core" in a highly-integrated "system-on-a-chip" (SOC) for use in multimedia applications, network routers, video mobile phones, intelligent automobiles, digital television, voice recognition, 3D games, etc.

It will be understood that the present invention has been described above purely by way of example, and modifications of detail can be made within the scope of the invention.

Each feature disclosed in the description, and (where appropriate) the claims and drawings may be provided independently or in any appropriate combination.

What is claimed is:

1. A processor comprising:
   a plurality of pipeline clusters, each cluster having a plurality of pipelines and each pipeline having a plurality of pipeline stages for executing an instruction on successive clock cycles; and
   stall control circuitry which controls the stalling of instructions in the pipelines in response to a stall signal generated in any one of the pipelines; the stall control circuitry being adapted to stall the execution of an instruction in a pipeline not generating the stall signal at least one clock cycle later than the execution of an instruction in a pipeline generating the stall signal, and to release the stall in the pipeline not generating the stall signal at least one clock cycle later than the stall in the pipeline generating the stall signal,
   the stall control circuitry being operable, when a pipeline of one cluster becomes locally stalled, to cause a global stall signal to be generated by that cluster and to be propagated to the other clusters to bring about stalling of the execution of instructions in the pipelines of those other clusters said one or more clock cycles after the stalling of said one cluster, and being further operable to inhibit a first cluster, having such a locally-stalled pipeline, from generating the global stall signal if a global stall signal generated by another locally-stalled pipeline in a second cluster is being propagated down the first cluster.

2. A processor according to claim 1 wherein the stall control circuitry is arranged such that, when a pipeline stage in a first pipeline receives a stall signal from a second pipeline, the execution of instructions in the pipeline stage in the first pipeline is not stalled if that pipeline stage stalled in the previous cycle in response to a stall signal generated by the first pipeline.

3. A processor according to claim 1 wherein the stall control circuitry is arranged such that, when a pipeline generates a stall signal at a stage i, all stages up to and including stage i of that pipeline are stalled.

4. A processor according to claim 1 wherein, when a pipeline generates a stall signal at a stage i, all stages up to and including stage i of that pipeline are stalled on a given clock cycle, and all stages up to and including stage i+m of a pipeline not generating a stall signal are stalled m clock cycles later than said given clock cycle, where m is an integer greater than or equal to 1.

5. A processor according to claim 1 wherein the stall control circuitry is arranged to stall execution of instructions in pipelines within a cluster in the same clock cycle.

6. A processor according to claim 1 wherein, in operation, instructions entering the respective pipelines of a cluster in parallel exit the pipelines of the cluster in parallel.

7. A processor according to claim 1 wherein, in operation, different instructions are executed in different clusters.

8. A processor according to claim 1, being a VLIW processor in which instructions from a VLIW instruction packet are issued in parallel to the pipelines of the clusters.

9. A processor according to claim 1 wherein each pipeline includes at least one execute stage in which an instruction is at least partially executed.

10. A processor according to claim 1 wherein the stall control circuitry is distributed between two or more pipeline stages in a pipeline of a cluster.

11. A processor according to claim 1 wherein two or more pipeline stages in a pipeline of a cluster each have associated stall control circuitry for controlling the stalling of that pipeline stage.

12. A processor according to claim 11 wherein the stall control circuitry in each pipeline stage is arranged to generate a global stall signal for stalling a pipeline in another cluster, and to receive a global stall signal from pipeline in another cluster for stalling the pipeline stage with which the circuitry is associated.

13. A processor according to claim 12 wherein the stall control circuitry does not generate a global stall signal if the associated pipeline stage is subject to a global stall from the same stage or later in said pipeline of said another cluster.

14. A processor according to claim 11 wherein the stall control circuitry in each of the two or more pipeline stages is substantially the same.

15. A processor according to claim 1 wherein a pipeline stage is not stalled if there is a bubble in that pipeline stage.

16. A method of operating a processor, the processor comprising a plurality of pipeline clusters, each cluster having a plurality of pipelines and each pipeline having a plurality of pipeline stages for executing instructions on successive clock cycles, each pipeline being capable of generating a stall signal, the method comprising:

generating a stall signal in one of the pipelines;

stalling the execution of an instruction in the pipeline generating the stall signal and stalling the execution of an instruction in a pipeline not generating the stall signal at least one clock cycle later;

releasing the stall in the pipeline generating the stall signal; and releasing the stall in the pipeline not generating the stall signal at least one clock cycle later;

wherein:

when a pipeline of one cluster becomes locally stalled, that cluster generates a global stall signal;

the global stall signal is propagated to the other clusters to bring about stalling of the execution of instructions in the pipelines of those other clusters said one or more clock cycles after the stalling of said one cluster; and a first cluster, having such a locally-stalled pipeline, is inhibited from generating the global stall signal if a global stall signal generated by another locally-stalled pipeline in a second cluster is being propagated down the first cluster.

17. A processor according to claim 1 wherein the pipelines are not flushed in response to the stall signal.

* * * * *